(12) United States Patent
Ayhan et al.

(10) Patent No.: US 10,943,492 B2
(45) Date of Patent: Mar. 9, 2021

(54) FOUR-DIMENSIONAL TRAJECTORY UPLINKING SYSTEM FOR AIRCRAFT

(71) Applicant: The Boeing Company, Chicago, IL (US)

(72) Inventors: Samet M. Ayhan, Fairfax, VA (US); Ian A. Wilson, Port Orange, FL (US)

(73) Assignee: The Boeing Company, Chicago, IL (US)

( * ) Notice: Subject to any disclaimer, the term of this patent is extended or adjusted under 35 U.S.C. 154(b) by 210 days.

(21) Appl. No.: 16/262,519

(22) Filed: Jan. 30, 2019

(65) Prior Publication Data

US 2020/0242947 A1 Jul. 30, 2020

(51) Int. Cl.
| | | |
|---|---|---|
| G08G 5/00 | (2006.01) | |
| G05D 1/10 | (2006.01) | |
| H04B 7/185 | (2006.01) | |
| H04L 29/08 | (2006.01) | |

(52) U.S. Cl.
CPC ........... *G08G 5/0021* (2013.01); *G05D 1/101* (2013.01); *G08G 5/0039* (2013.01); *H04B 7/18506* (2013.01); *H04L 67/12* (2013.01)

(58) Field of Classification Search
CPC .... G08G 5/0021; G08G 5/0039; G05D 1/101; H04B 7/18506; H04L 67/12
USPC .......................................................... 701/7
See application file for complete search history.

(56) References Cited

U.S. PATENT DOCUMENTS

| | | | | |
|---|---|---|---|---|
| 8,630,790 B1* | 1/2014 | Bailey | ................. | G08G 5/0013 701/120 |
| 9,412,278 B1* | 8/2016 | Gong | ................. | G08G 5/0091 |
| 2003/0093187 A1* | 5/2003 | Walker | ............... | B64D 45/0059 701/1 |
| 2007/0008927 A1* | 1/2007 | Herz | ...................... | H04L 45/30 370/331 |
| 2010/0152931 A1* | 6/2010 | Lacombe | ............. | G08G 5/0091 701/8 |
| 2012/0245834 A1* | 9/2012 | Klooster | ............. | G08G 5/0039 701/120 |
| 2013/0085661 A1* | 4/2013 | Chan | .................... | G08G 5/0082 701/122 |
| 2013/0085669 A1* | 4/2013 | Bailey | .................. | G08G 5/0091 701/467 |

(Continued)

FOREIGN PATENT DOCUMENTS

EP 2503530 A2 9/2012

OTHER PUBLICATIONS

Extended European Search Report, dated Jun. 26, 2020, regarding Application No. EP20154384.0, 7 pages.

*Primary Examiner* — Yazan A Soofi

(74) *Attorney, Agent, or Firm* — Yee & Associates, P.C.

(57) ABSTRACT

A method, an apparatus, and a system for transmitting four-dimensional trajectories to an aircraft. Four-dimensional trajectory information for a four-dimensional trajectory for a flight of an aircraft is received. The four-dimensional trajectory information includes trajectory change points describing the four-dimensional trajectory. A subset of the trajectory change points that describe a shape of the four-dimensional trajectory is selected. A message containing the subset of the trajectory change points is created in a format used by an aircraft computer system in the aircraft. The message is transmitted to the aircraft computer system.

25 Claims, 7 Drawing Sheets

(56) References Cited

U.S. PATENT DOCUMENTS

| | | | |
|---|---|---|---|
| 2013/0110387 A1* | 5/2013 | Castillo-Effen | G08G 5/0095 |
| | | | 701/120 |
| 2016/0093217 A1* | 3/2016 | Hale | G08G 5/0021 |
| | | | 701/120 |
| 2016/0240088 A1* | 8/2016 | McGuffin | G08G 5/0021 |
| 2017/0013061 A1* | 1/2017 | Coulmeau | G08G 5/0052 |
| 2017/0257320 A1* | 9/2017 | Bolling | H04L 67/12 |
| 2018/0068567 A1* | 3/2018 | Gong | G08G 5/0034 |
| 2018/0102832 A1* | 4/2018 | Chang | H04B 7/18506 |

\* cited by examiner

500

502
```
<fx:Flight xmlns:xsi="http://www.w3.org/2001/XMLSchema-instance"
xmlns:xs="http://www.w3.org/2001/XMLSchema" xmlns:fb="http://www.fixm.aero/base/3.0"
xmlns:ff="http://www.fixm.aero/foundation/3.0"
xmlns:fx="http://www.fixm.aero/flight/3.0"
xsi:schemaLocation="http://www.fixm.aero/fixm/3.0 core/Fixm.xsd" system="TPE">
<fx:agreed>
<fx:trajectory>
```

504
```
<fx:trajectoryPoint>
<fx:point time="2016-12-06T17:24:00.000Z" srsName="urn:ogc:def:crs:EPSG::4326">
<ff:pos>20.0 -168.0</ff:pos>
<fx:altitude ref="FLIGHT_LEVEL" uom="FEET">38000</fx:altitude>
</fx:point>
<fx:predictedAirspeed>
<fb:airspeed uom="KNOTS">270</fb:airspeed>
</fx:predictedAirspeed>
<fx:trajectoryChangeType>SPEED_CHANGE</fx:trajectoryChangeType>
</fx:trajectoryPoint>
```

506
```
<fx:trajectoryPoint>
<fx:point time="2016-12-06T17:25:00.000Z" srsName="urn:ogc:def:crs:EPSG::4326">
<ff:pos>21.0 -169.0</ff:pos>
<fx:altitude ref="FLIGHT_LEVEL" uom="FEET">39000</fx:altitude>
</fx:point>
<fx:predictedAirspeed>
<fb:airspeed uom="KNOTS">240</fb:airspeed>
</fx:predictedAirspeed>
<fx:trajectoryChangeType>TOP_OFF_CLIMB</fx:trajectoryChangeType>
</fx:trajectoryPoint>
```

508
```
<fx:trajectoryPoint>
<fx:point time="2016-12-06T17:26:00.000Z" srsName="urn:ogc:def:crs:EPSG::4326">
<ff:pos>22.0 -170.0</ff:pos>
<fx:altitude ref="FLIGHT_LEVEL" uom="FEET">39000</fx:altitude>
</fx:point>
<fx:predictedAirspeed>
<fb:airspeed uom="KNOTS">260</fb:airspeed>
</fx:predictedAirspeed>
<fx:trajectoryChangeType>SPEED_CHANGE</fx:trajectoryChangeType>
</fx:trajectoryPoint>
```

510
```
<fx:trajectoryPoint>
<fx:point time="2016-12-06T17:27:00.000Z" srsName="urn:ogc:def:crs:EPSG::4326">
<ff:pos>23.0 -171.0</ff:pos>
<fx:altitude ref="FLIGHT_LEVEL" uom="FEET">39000</fx:altitude>
</fx:point>
<fx:predictedAirspeed>
<fb:airspeed uom="KNOTS">260</fb:airspeed>
</fx:predictedAirspeed>
<fx:trajectoryChangeType>LEVEL_OFF</fx:trajectoryChangeType>
</fx:trajectoryPoint>
```

512
```
</fx:trajectory>
</fx:agreed>
<fx:aircraftDescription>
<fx:aircraftType>
<fx:icaoModelIdentifier>B737</fx:icaoModelIdentifier>
</fx:aircraftType>
</fx:aircraftDescription>
<fx:flightIdentification aircraftIdentification="JTA243"/>
<fx:gufi codeSpace="urn:uuid">a1e8d7c5-e494-4659-99e2-2f9bccfcb311</fx:gufi>
</fx:Flight>
```

FIG. 5

FOUR-DIMENSIONAL TRAJECTORY UPLINKING SYSTEM FOR AIRCRAFT

BACKGROUND INFORMATION

1. Field

The present disclosure relates generally to aircraft and, in particular, to a method, an apparatus, and a system for sending flight plans with four-dimensional trajectories to an aircraft computer system.

2. Background

Air traffic data is currently disseminated by System Wide Information Management (SWIM) on the ground. System Wide Information Management is an initiative directed towards harmonizing the exchange of weather and flight information. System Wide Information Management has been implemented to facilitate greater sharing of air traffic management system information, such as operation status, weather information, flight data, status of special use airspace, and National Airspace (NAS) restrictions.

System Wide Information Management uses a Flight Information Exchange Model (FIXM) as a data model. This data model provides a format for the exchange of information on flight data for aircraft. This model employs Extensible Markup Language (XML) as a protocol for messages.

A flight management computer (FMC) is a point of communication in the aircraft that uses Aeronautical Radio, Incorporated (ARINC) 702A as the data model and Aircraft Communications Addressing and Reporting System (ACARS) as the protocol for communication.

SUMMARY

An embodiment of the present disclosure provides an aircraft trajectory uplink system comprising a computer system and a trajectory manager running on the computer system. The trajectory manager operates to receive a data model message created using a data model. The data model message contains four-dimensional trajectory information for a four-dimensional trajectory for a flight of an aircraft. The trajectory manager to identify trajectory change points in the four-dimensional trajectory information and select a subset of the trajectory change points that describe a shape of the four-dimensional trajectory. The trajectory manager operates to create an uplink message containing the subset of the trajectory change points in a format used by an aircraft computer system in the aircraft and transmit the uplink message to the aircraft computer system in an uplink. The uplink message is in the format used by the aircraft computer system and the subset of the trajectory change points in the uplink message are used by the aircraft computer system during the flight of the aircraft to follow the four-dimensional trajectory described in by the trajectory change points in the uplink message.

Another embodiment of present disclosure provides an aircraft trajectory uplink system comprising a computer system and a trajectory manager running on the computer system. The trajectory manager operates to identify four-dimensional trajectory information for a four-dimensional trajectory for a flight of an aircraft, wherein the four-dimensional trajectory information includes trajectory change points describing the four-dimensional trajectory; selects a subset of the trajectory change points in that describe a shape of the four-dimensional trajectory; creates a message containing the subset of the trajectory change points in a format used by an aircraft computer system in the aircraft; and transmits the message to the aircraft computer system.

Yet another embodiment of the present disclosure provides a method for transmitting four-dimensional trajectories to an aircraft. Four-dimensional trajectory information for a four-dimensional trajectory for a flight of an aircraft is received. The four-dimensional trajectory information includes trajectory change points describing the four-dimensional trajectory. A subset of the trajectory change points that describe a shape of the four-dimensional trajectory is selected. A message containing the subset of the trajectory change points is created in a format used by an aircraft computer system in the aircraft. The message is transmitted to the aircraft computer system.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 5 is an illustration of a data model message for a four-dimensional trajectory in accordance with an illustrative embodiment;

DETAILED DESCRIPTION

Figure 1:
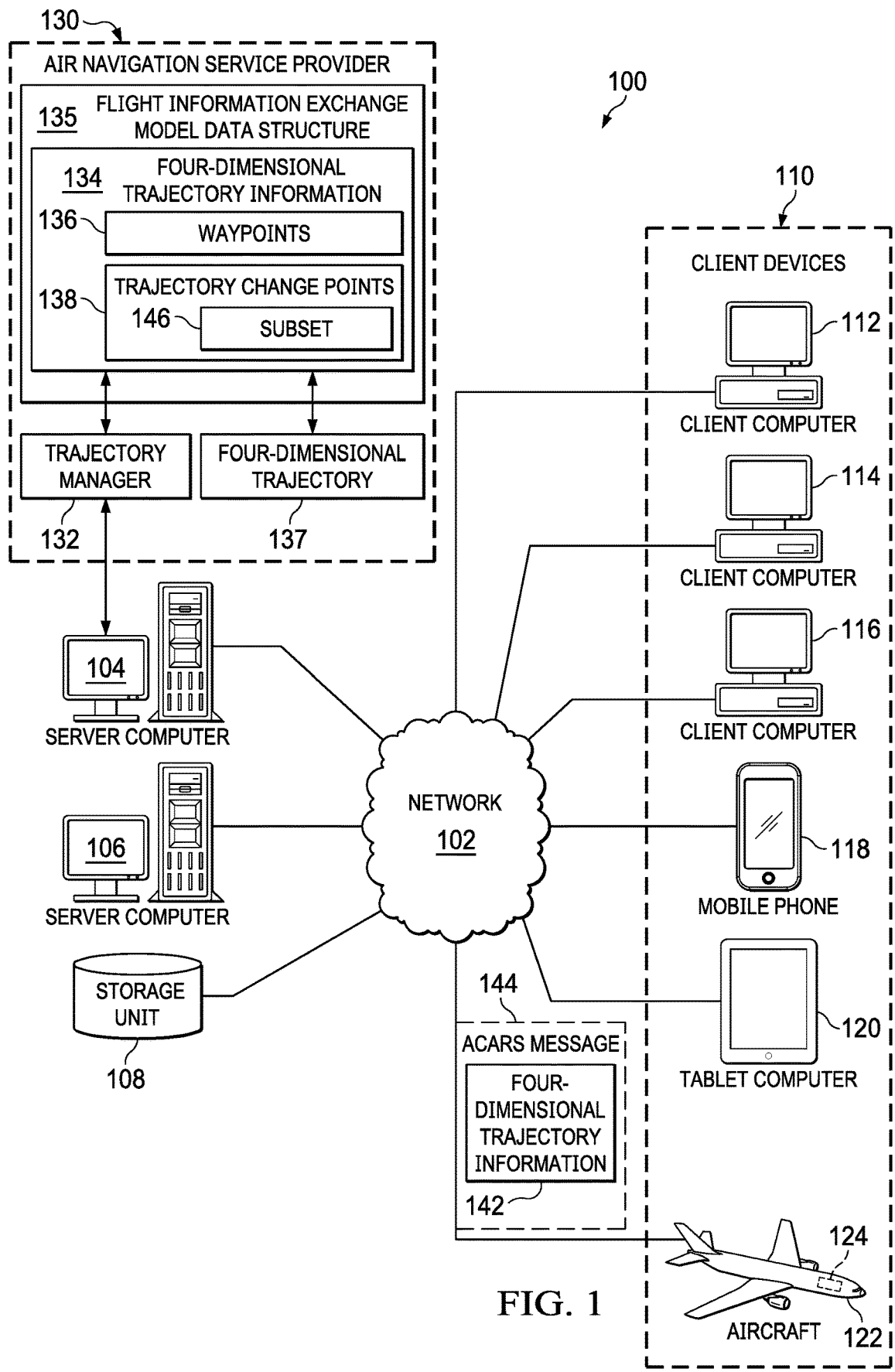
FIG. 1 is an illustration of a network of data processing systems in accordance with an illustrative embodiment.

The illustrative embodiments recognize and take into account one or more different considerations. For example, the illustrative embodiments recognize and take into account that airlines desire to operate aircraft using trajectories that are based on operational considerations for the airlines, such as timeliness and cost. For example, the illustrative embodiments recognize and take into account that an airline often desires a four-dimensional trajectory that reduces total flight time, saves fuel, and provides other benefits for the airline operations.

The illustrative embodiments recognize and take into account that, currently, decisions on four-dimensional trajectories used by aircraft are performed by an air navigation service provider such as the Federal Aviation Administration (FAA). The illustrative embodiments recognize and take into account that the four-dimensional trajectories selected by the air navigation service provider take into account deconfliction and other safety parameters.

The illustrative embodiments recognize and take into account that a trajectory of a negotiation can provide a mechanism to exchange trajectories between the air navigation service provider on the ground and the aircraft for the airplane in the air. The illustrative embodiments recognize and take into account, however, that current data models and protocols for communicating information are different between those used on the ground and those that are used for aircraft in the air.

The illustrative embodiments recognize and take into account that a number of different factors are present that increase the difficulty in sending four-dimensional trajectories to an aircraft. For example, the illustrative embodiments recognize and take into account that using the Flight Information Exchange Model (FIXM) results in messages that are much larger than those currently used under ARINC 702A, which are transmitted using ACARS. The illustrative embodiments recognize and take into account that the amount of data present using ground-based models and protocols is undesirable with the limited amount of bandwidth currently available for use in communicating with an aircraft in the air.

Therefore, it would be desirable to have a method and an apparatus that take into account at least some of the issues discussed above, as well as other possible issues. For example, it would be desirable to have a method and an apparatus that overcome a technical problem with sending four-dimensional trajectory information currently generated on the ground to an aircraft in a manner that is usable by aircraft computer systems, such as flight control computers.

Thus, the illustrative embodiments provide a method, an apparatus, and a system for transmitting four-dimensional trajectories to an aircraft. In one illustrative example, the method transmits four-dimensional trajectories to an aircraft. Four-dimensional trajectory information for a four-dimensional trajectory for a flight of an aircraft is received. The four-dimensional trajectory information includes trajectory change points describing the four-dimensional trajectory. A subset of the trajectory change points that describe a shape of the four-dimensional trajectory is selected. A message containing the subset of the trajectory change points is created in a format used by an aircraft computer system in the aircraft. The message is transmitted to the aircraft computer system.

With reference now to the figures and, in particular, with reference to FIG. 1, an illustration of a network of data processing systems is depicted in accordance with an illustrative embodiment. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102. As depicted, client devices 110 include client computer 112, client computer 114, and client computer 116. Client devices 110 can be, for example, computers, workstations, or network computers. In the depicted example, server computer 104 provides information, such as boot files, operating system images, and applications to client devices 110. Further, client devices 110 can also include other types of client devices such as mobile phone 118, tablet computer 120, and aircraft 122. In this illustrative example, server computer 104, server computer 106, storage unit 108, and client devices 110 are network devices that connect to network 102 in which network 102 is the communications media for these network devices. Some or all of client devices 110 may form an Internet of Things (IoT) in which these physical devices can connect to network 102 and exchange information with each other over network 102.

For example, aircraft 122 is a device in the form of a vehicle that can be in an Internet-of-Things (IoT). As depicted, aircraft 122 includes flight management computer 124 enabling processing of information and communications with other client devices and other computers such as server computer 104 and server computer 106 in network data processing system 100.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage medium and downloaded to a data processing system or other device for use. For example, program code can be stored on a computer-recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks.

For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As another example, network data processing system 100 uses a different communications protocol when data processing systems on the ground communicate with flight management computer 124 in aircraft 122. In the illustrative example, another protocol, Aircraft Communications Addressing and Reporting System (ACARS), is used by data processing systems on the ground to communicate with aircraft 122.

As used herein, "a number of," when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

In this illustrative example, server computer 104 is operated by Air Navigation Service Provider (ANSP) 130. In this illustrative example, Air Navigation Service Provider 130 is the Federal Aviation Administration (FAA). As depicted, trajectory manager 132 runs on server computer 104 and generates four-dimensional trajectory 137 for aircraft 122. Four-dimensional trajectory 137 is described by four-dimensional trajectory information 134.

As depicted, four-dimensional trajectory information 134 is stored in Flight Information Exchange Model data structure 135. This data structure can take a number of different forms. For example, Flight Information Exchange Model data structure 135 can be a file, a message, a database, or some other suitable type of data structure.

Four-dimensional trajectory information 134 describes a route for aircraft 122 to fly from a departure location to a destination location. In this illustrative example, four-dimensional trajectory 137 is described by four-dimensional trajectory information 134 as specified by a Flight Information Exchange Model (FIXM) and transmitted using Extensible Markup Language (XML). Flight Information Exchange Model is a ground-based trajectory schema for describing four-dimensional trajectories.

Four-dimensional trajectory information 134 specified by the Flight Information Exchange Model and the format of this information in Extensible Markup Language is not one that is usable to transmit for uplink of four-dimensional trajectory 137 to aircraft 122.

As depicted, four-dimensional trajectory information 134 comprises waypoints 136 and trajectory change points 138. Waypoints 136 include, for example, a departure waypoint and destination waypoints. Trajectory change points 138 include at least one of a speed trajectory change point, a start of turn trajectory change point, an altitude trajectory change point, or other suitable types of trajectory change points.

In this illustrative example, trajectory manager 132 processes the information describing four-dimensional trajectory 137 to create Aircraft Communications Addressing and Reporting System (ACARS) message 144 containing four-dimensional trajectory information 142 describing four-dimensional trajectory 137. In this illustrative example, the creation of ACARS message 144 is not a mere translation of four-dimensional trajectory information 134 from a Flight Information Exchange Model format into an ARINC 702A format.

Trajectory manager 132 parses four-dimensional trajectory information 134 to identify waypoints 136 and trajectory change points 138 described using a Flight Information Exchange Model. Trajectory manager 132 identifies subset 146 of trajectory change points 138. Subset 146 of trajectory change points 138 is a minimum of the number of trajectory change points 138 that describes the three-dimensional shape of the route or path for four-dimensional trajectory 137, that is to be flown by aircraft 122. Subset 146 of trajectory change points 138 can include more than the minimum number of trajectory change points 138 when that number of trajectory change points 138 can be used by flight management computer 124 in aircraft 122.

ACARS message 140 is uplinked to flight management computer 124 in aircraft 122 for use in operating aircraft 122. This information can be used by at least one of a flight management computer or a pilot to control flight of aircraft 122 to follow four-dimensional trajectory 137.

With the process used by trajectory manager 132 to create four-dimensional trajectory information 142 in ACARS message 144, communication between the ground and the air is enabled without requiring a protocol change by flight management computer 124. This process also maintains the three-dimensional shape of the route or path for aircraft 122 while reducing the number of trajectory change points 138 to a manageable number for flight management computer 124.

Figure 2:
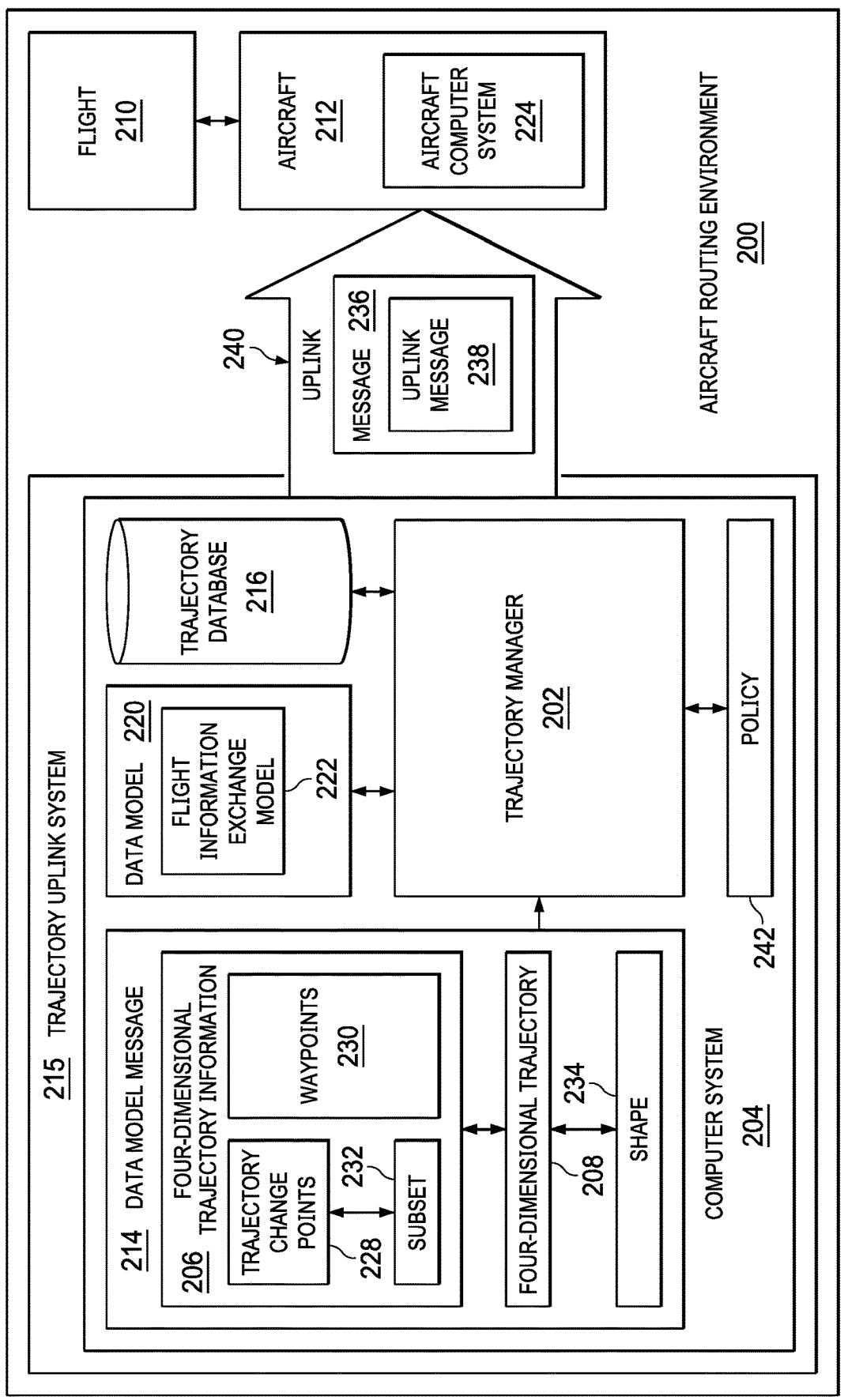
FIG. 2 is an illustration of a block diagram of an aircraft routing environment in accordance with an illustrative embodiment.

With reference now to FIG. 2, an illustration of a block diagram of an aircraft routing environment is depicted in accordance with an illustrative embodiment. In this illustrative example, aircraft routing environment 200 includes components that can be implemented in hardware such as the hardware shown in network data processing system 100 in FIG. 1.

In this illustrative example, trajectory manager 202 in computer system 204 identifies four-dimensional trajectory information 206 for four-dimensional trajectory 208 for flight 210 of aircraft 212. As depicted in this example, trajectory manager 202 in computer system 204 form trajectory uplink system 215. In this illustrative example, four-dimensional trajectory information 206 can be identified in a number of different ways.

For example, four-dimensional trajectory information 206 can be received in data model message 214, retrieved from trajectory database 216, received from Flight Information Exchange Model 222, or retrieved or received from some other source.

In this illustrative example, data model 220 defines how four-dimensional trajectory information 206 describing four-dimensional trajectory 208 is structured. For example, data model 220 can be Flight Information Exchange Model (FIXM) 222. In this example, Flight Information Exchange Model 222 specifies using an Extensible Markup Language (XML) to encode four-dimensional trajectory information 206 for four-dimensional trajectory 208.

As depicted, trajectory manager 202 identifies trajectory change points 228 in four-dimensional trajectory information 206. In this illustrative example, trajectory change points 228 are in four dimensions. For example, a trajectory change point in trajectory change points 228 includes latitude, longitude, altitude, and time. The time indicates when the particular changes are to be made during flight 210 of aircraft 212. Four-dimensional trajectory information 206 can also include other information such as predicted air speed, altitude reference, and other suitable information.

In this illustrative example, trajectory manager 202 can identify trajectory change points 228 by parsing four-dimensional trajectory information 206 to identify trajectory change points 228 present in four-dimensional trajectory information 206.

Additionally, trajectory manager 202 also can identify waypoints 230 in four-dimensional trajectory information 206. Waypoints 230 can include, for example, an origination waypoint and a destination waypoint. Trajectory manager 202 selects subset 232 of trajectory change points 228 that describes shape 234 of four-dimensional trajectory 208. As depicted, shape 234 is a three-dimensional shape. Shape 234 can be a four-dimensional shape when time is included to describe locations in the three-dimensional shape are to be flown at particular points in time.

In this illustrative example, a selection of subset 232 of trajectory change points 228 describing shape 234 for four-dimensional trajectory 208 can be performed by trajectory manager 202 using policy 242. Policy 242 is a number of rules that can also include data to apply the rules in selecting subset 232. In this illustrative example, policy 242 defines which ones of trajectory change points 228 are needed to describe shape 234 of four-dimensional trajectory 208. For example, the rules in policy 242 can define at least one of how many trajectory change points 228, the types of trajectory change points 228, which ones of trajectory change points 228 are considered to be needed to describe shape 234 with a desired level of accuracy, or other suitable considerations.

Further, subset 232 may not always be a minimum subset of trajectory change points 228 needed to describe shape 234. In some illustrative examples, additional ones of trajectory change points 228 can be included. The number of trajectory change points 228 selected for subset 232 using policy 242 can be selected from at least one of bandwidth for an uplinked transmission, manageability or usability by a flight management system in computer system 224 in aircraft 212, or other suitable situations.

Trajectory manager 202 creates message 236 containing subset 232 of trajectory change points 228. The information used can be specified by a standard, such as Aeronautical Radio, Incorporated (ARINC) 702A. In this illustrative example, message 236 can comprise a number of waypoints 230 and subset 232 of trajectory change points 228. Message 236 can be an amended flight plan for aircraft 212 that is used by a flight management computer in aircraft computer system 224 for flight 210 of aircraft 212.

Trajectory change points 228 can be selected from at least one of a start of a turn trajectory change point or an altitude trajectory change point to describe shape 234 in one illustrative example. In this particular example, speed trajectory change points are omitted as being unnecessary.

Additionally, message 236 is in a format used by aircraft computer system 224 in aircraft 212. For example, the protocol can be Aircraft Communications Addressing and Reporting System (ACRAS). In this example, message 236 can be transmitted to aircraft 212 over at least one of a wireless connection or a wired connection. The wired connection can be selected from a group comprising a wire, a cable, and an optical fiber.

In this illustrative example, trajectory manager 202 can transmit message 236 to aircraft computer system 224 in aircraft 212. In this illustrative example, message 236 can be referred to as uplink message 238. Uplink message 238 can be transmitted to aircraft computer system 224 in uplink 240. In this example, uplink 240 is a wireless connection.

As depicted, uplink message 238 is in a format used by aircraft computer system 224. Subset 232 of trajectory change points 228 in uplink message 238 are used by aircraft computer system 224 during flight 210 of aircraft 212 to follow four-dimensional trajectory 208 described by trajectory change points 228 in uplink message 238. Four-dimensional trajectory information 206 can also be displayed on a display system in aircraft 212 by aircraft computer system 224 to a pilot, a co-pilot, or both for use in operating aircraft 212.

Trajectory manager 202 can be implemented in software, hardware, firmware, or a combination thereof. When software is used, the operations performed by trajectory manager 202 can be implemented in program code configured to run on hardware, such as a processor unit. When firmware is used, the operations performed by trajectory manager 202 can be implemented in program code and data and stored in persistent memory to run on a processor unit. When hardware is employed, the hardware can include circuits that operate to perform the operations in trajectory manager 202.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components, excluding a human being. For example, the processes can be implemented as circuits in organic semiconductors.

Computer system 204 and aircraft computer system 224 are physical hardware systems and each includes one or more data processing systems. When more than one data processing system is present in either one or both of computer system 204 and aircraft computer system 224, those data processing systems are in communication with each other using a communications medium. The communications medium can be a network. The data processing systems can be selected from at least one of a computer, an electronic flight bag, a server computer, a tablet computer, or some other suitable data processing system.

In one illustrative example, one or more technical solutions are present that overcome a technical problem with sending four-dimensional trajectory information 206 for four-dimensional trajectory 208 to aircraft computer system 224 in aircraft 212. As a result, one or more technical solutions can provide a technical effect of enabling the sending of four-dimensional trajectory 208 in a manner that is usable by aircraft computer system 224. For example, one or more technical solutions are present for enabling sending four-dimensional trajectory 208 that is described using data model 220 in the form of Flight Information Exchange Model (FIXM) and encoded in Extensible Markup Language (XLM).

In the illustrative example, one or more technical solutions are present in which message 236 is not merely a translation of information described using Flight Information Exchange Model (FIXM) into the manner described according to Aeronautical Radio, Incorporated (ARINC) 702A. The illustrative example provides one or more technical solutions that reduce the amount of information in data model message 214 into message 236 that contains an amount of four-dimensional trajectory information 206 that is usable or manageable by aircraft computer system 224 in aircraft 212.

In this manner, a ground-based trajectory, following a data model, such as Flight Information Exchange Model (FIXM), can be processed to form an air-based trajectory following a standard, such as ARINC 702A, in a manner that avoids having to change models or protocols. The different processes are implemented in a practical application that enables sending four-dimensional trajectory information between ground stations and aircraft. In this manner, negotiations of four-dimensional trajectories can occur using the practical application of the processes described in the different illustrative examples.

Thus, in the illustrative example, one or more technical solutions are present in which four-dimensional trajectory 208, described using four-dimensional trajectory information 206 based on data model 220, can be processed for use by aircraft computer system 224 in aircraft 212. In the illustrative examples, the process identifies portions of four-dimensional trajectory information 206 that are usable by aircraft computer system 224 during flight 210 of aircraft 212. For example, in the illustrative example, trajectory manager 202 identifies subset 232 of trajectory change points 228 in four-dimensional trajectory 208. This subset contains a number of trajectory change points 228 that are sufficient to describing shape 234 of the path or route flown by aircraft 212. This subset of trajectory change points 228 is placed into message 236. Other information also can be included in message 236 such as a number of waypoints 230. Message 236 is in a format used by aircraft computer system 224 in contrast to the format specified by data model 220.

Computer system 204 can be configured to perform at least one of the steps, operations, or actions described in the different illustrative examples using software, hardware, firmware, or a combination thereof. As a result, computer system 204 operates as a special purpose computer system in which trajectory manager 202 in computer system 204 enables sending four-dimensional trajectory, 208 described in four-dimensional trajectory information 206 generated to follow data model 220 in uplink message 238 to aircraft 212. In particular, trajectory manager 202 transforms computer system 204 into a special purpose computer system as compared to currently available general computer systems that do not have trajectory manager 202.

In the illustrative example, the use of trajectory manager 202 in computer system 204 integrates processes into a practical application of a method to transmit four-dimensional trajectories to an aircraft that increases the performance of aircraft computer system 224. In other words, trajectory manager 202 in computer system 204 is directed to a practical application of processes integrated into trajectory manager 202 in computer system 204 that identifies subset 232 of trajectory change points 228 in four-dimensional trajectory information 206 for four-dimensional trajectory 208 and places subset 232 of trajectory change points 228 into message 236 that is usable by aircraft computer system 224. In this manner, trajectory manager 202 in computer system 204 provides a practical application of processes manage four-dimensional trajectory information 206 in a manner that can be uplinked to aircraft computer system 224 such that aircraft computer system 224 can use four-dimensional trajectory information 206 to fly aircraft 212.

The illustration of aircraft routing environment 200 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, speed trajectory change points can also be included in message 236 within subset 232 of trajectory change points 228. This type of trajectory change point can be included depending on the size or amount of information to be transmitted in message 236 to aircraft computer system 224. Further, in some illustrative examples, aircraft computer system 224 can be configured to use speed trajectory change points.

Figure 3:
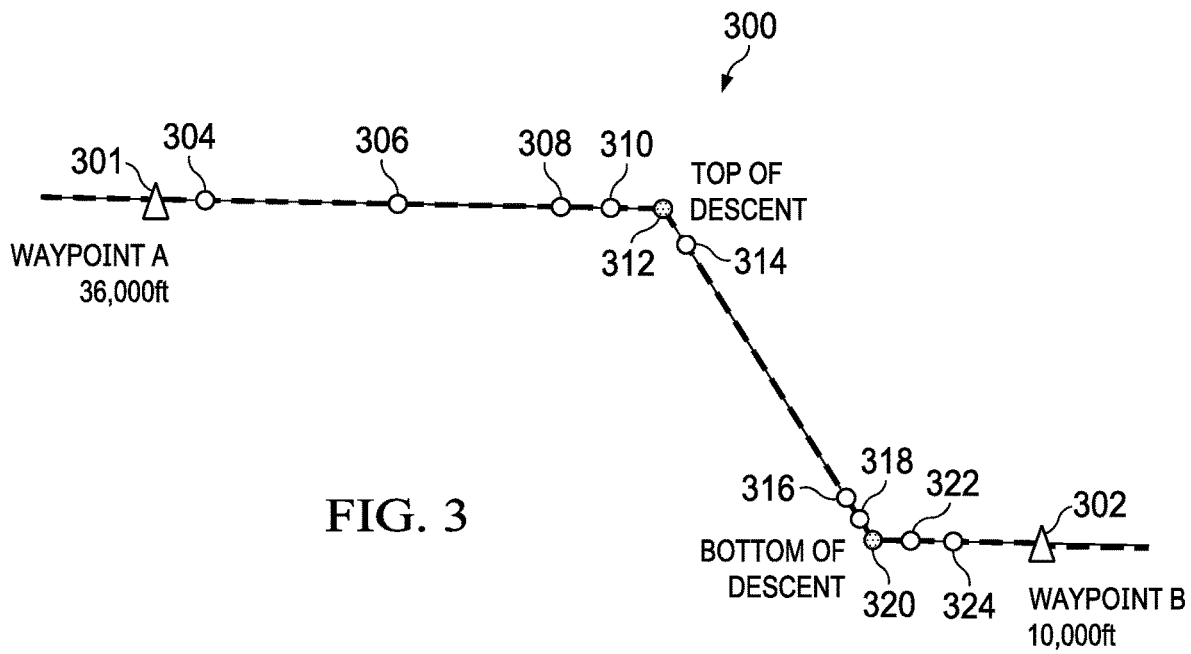
FIG. 3 is an illustration of four-dimensional trajectory information for a four-dimensional trajectory in accordance with an illustrative embodiment.
Figure 4:
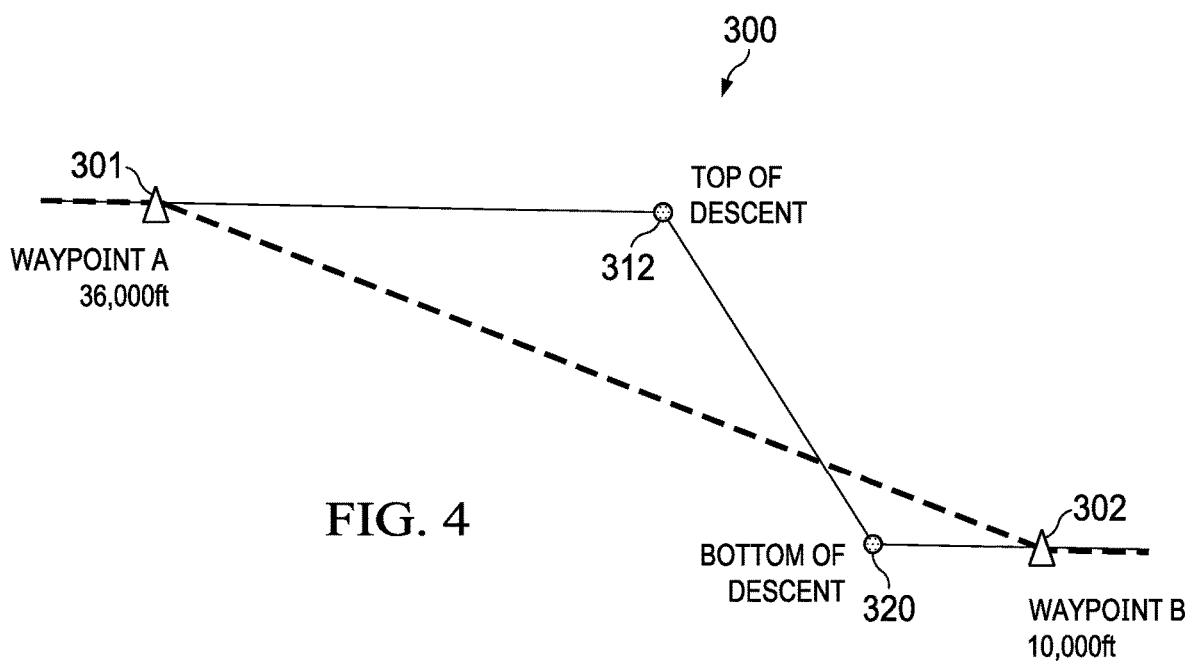
FIG. 4 is an illustration of four-dimensional trajectory information for a four-dimensional trajectory for use by an aircraft computer system in accordance with an illustrative embodiment.

FIG. 3 and FIG. 4 illustrate four-dimensional trajectory information for a four-dimensional trajectory in accordance with an illustrative. With reference first to FIG. 3, an illustration of four-dimensional trajectory information for a four-dimensional trajectory is depicted in accordance with an illustrative embodiment. In this illustrative example, a profile view of four-dimensional trajectory information for four-dimensional trajectory 300 is depicted. Four-dimensional trajectory 300 is an example of four-dimensional trajectory 208 shown in block form in FIG. 2. The depicted view in this illustrative example shows latitude and altitude. Longitude and time are not shown in this depicted example to avoid obscuring the description of how four-dimensional trajectory change information is processed between FIG. 3 and FIG. 4.

As depicted, waypoints and trajectory change points are four-dimensional trajectory information for four-dimensional trajectory 300. These waypoints and trajectory change points are examples of four-dimensional trajectory information 206 shown in block form in FIG. 2. The four-dimensional trajectory depicted in this example contains waypoints and trajectory change points that conform to a data model such as a Flight Information Exchange Model (FIXM).

As depicted in this example, the four-dimensional trajectory change information for four-dimensional trajectory 300 includes waypoint A 301 and waypoint B 302. This information also includes the following trajectory change points: trajectory change point 304, trajectory change point 306, trajectory change point 308, trajectory change point 310, trajectory change point 312, trajectory change point 314, trajectory change point 316, trajectory change point 318, trajectory change point 322, and trajectory change point 324.

In this illustrative example, more information is present than needed to describe the four-dimensional shape of the route or path that the aircraft will fly for four-dimensional trajectory 300. Trajectory manager 202, shown in block form in FIG. 2, can reduce the amount of information that is sent to the aircraft computer system. The trajectory change information can contain as little as Waypoint A 301 and Waypoint B 302. In this illustrative example, Waypoint A 301 is at 36,000 feet and Waypoint B 302 is at 10,000 feet. These two waypoints can be used as a flight plan for an aircraft, but, however, can result in an inability to allow other aircraft to use airspace between the upper altitude, 36,000 feet, as described by Waypoint A 301, and the lower altitude, 10,000 feet, as described by Waypoint B 302.

Four-dimensional trajectory 300 can be described with a sufficient amount of detail through reducing the number of trajectory change points to those trajectory change points that describe a shape of four-dimensional trajectory 300 with a desired amount of accuracy. In this illustrative example, a subset of these trajectory change points can be selected that describe a shape of four-dimensional trajectory 300 with a desired level of accuracy.

With reference next to FIG. 4, an illustration of four-dimensional trajectory information for a four-dimensional trajectory for use by an aircraft computer system is depicted in accordance with an illustrative embodiment. As depicted, four-dimensional trajectory 300 is shown with a reduced amount of four-dimensional trajectory information as compared to the illustration of this same trajectory shown in FIG. 3.

In this illustrative example, Waypoint A 301, trajectory change point 312, trajectory change point 320, and Waypoint B 302 comprise four-dimensional trajectory change information that can be sent to an aircraft computer system. The trajectory change points are a subset of the trajectory change points shown in FIG. 3 and are in a minimum number of trajectory change points that can describe a shape of four-dimensional trajectory 300 with a desired level of accuracy.

As depicted, trajectory change point 312 is the top of the descent for the aircraft. Trajectory change point 320 is the bottom of the descent for the aircraft. In this illustrative example, the trajectory change points retained are those that contribute to describing the shape of four-dimensional trajectory 300. Other trajectory change points shown in FIG. 3 are omitted.

These two waypoints and the two trajectory change points can be used to create an amended flight plan. This flight plan can be created using ARINC 702A standard and appointed using ACARS as the format.

Figure 6:
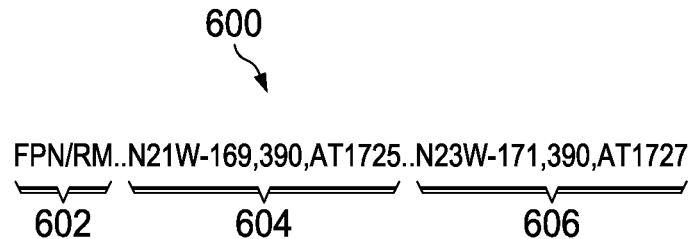
FIG. 6 is am illustration of a message for transmission to an aircraft in accordance with an illustrative embodiment.

In this illustrative example, FIGS. 5 and 6 illustrate four-dimensional trajectory information for a four-dimensional trajectory. These two figures illustrate information that describes the same four-dimensional trajectory.

With reference first to FIG. 5, an illustration of a data model message for a four-dimensional trajectory is depicted in accordance with an illustrative embodiment. As depicted, data model message 500 is an example of data model message 214 shown in block form in FIG. 2. In this example, data model message 500 describes a four-dimensional trajectory following Flight Information Exchange Model (FIXM). As depicted, data model message 500 includes Extensible Markup Language (XML) header 502, trajectory change point 504, trajectory change point 506, trajectory change point 508, trajectory change point 510, and Extensible Markup Language (XML) footer 512.

Turning next to FIG. 6, an illustration of a message for transmission to an aircraft is depicted in accordance with an illustrative embodiment. In this illustrative example, message 600 contains an amended flight in ARINC 702A that can be uploaded to a flight management computer in an aircraft computer system using ACARS as the transmission protocol.

As can be seen, message 600 includes header 602, trajectory change point 604, and trajectory change point 606. Trajectory change point 604 corresponds to trajectory change point 506 in FIG. 5. Trajectory change point 606 corresponds to trajectory change point 510 in FIG. 5.

As depicted, the Extensible Markup Language (XML) data, trajectory change point 504, and trajectory change point 508 are omitted. These two trajectory change points are speed trajectory change points and are unnecessary for use in data model message 500 to describe the shape of the four-dimensional trajectory.

Further, the use of Extensible Markup Language to describe trajectory change point 506 and trajectory change point 508 is unnecessary. As result, message 600 describes trajectory change points in a format that results in the transmission of much less information as compared to data model message 500.

Figure 7:
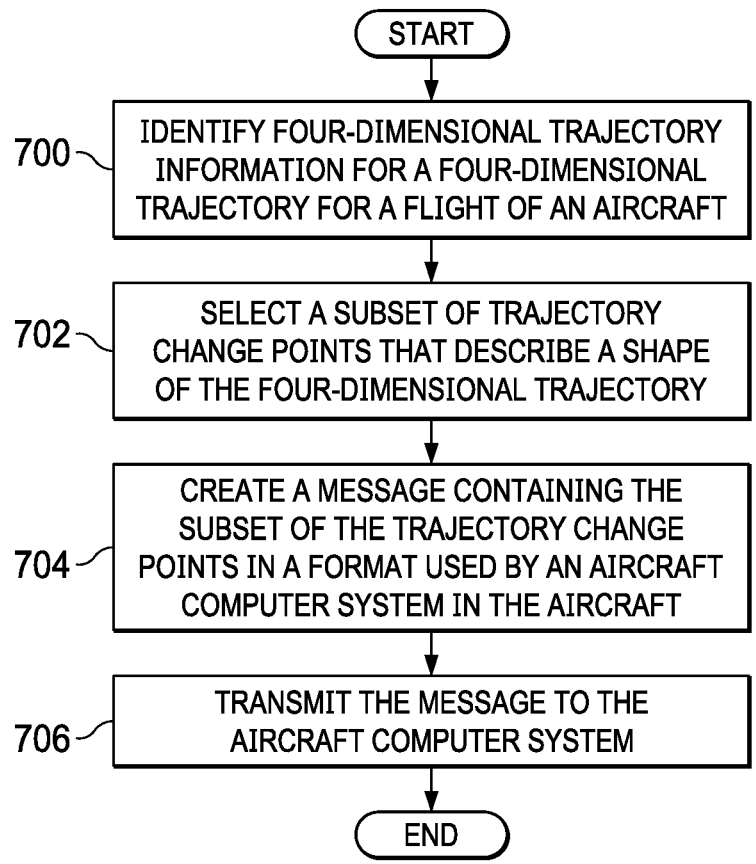
FIG. 7 is an illustration of a flowchart of a process for transmitting four-dimensional trajectories to an aircraft in accordance with an illustrative embodiment.

Turning next to FIG. 7, an illustration of a flowchart of a process for transmitting four-dimensional trajectories to an aircraft is depicted in accordance with an illustrative embodiment. The process in FIG. 7 can be implemented in hardware, software, or both. When implemented in software, the process can take the form of program code that is run by one of more processor units located in one or more hardware devices in one or more computer systems. For example, the process can be implemented in trajectory manager 202 in computer system 204 in FIG. 2.

The process begins by identifying four-dimensional trajectory information for a four-dimensional trajectory for a flight of an aircraft (operation 700). In operation 700, the four-dimensional trajectory information includes trajectory change points describing the four-dimensional trajectory. The four-dimensional trajectory information can also include other information such as waypoints.

In operation 700, the four-dimensional trajectory information can be identified by receiving the four-dimensional trajectory information for the four-dimensional trajectory for the aircraft in a Flight Information Exchange Model (FIXM). In other illustrative examples, the four-dimensional trajectory information can be received in a message from another computer or retrieved in response to a query to a database of four-dimensional trajectories to be used by the aircraft.

The process selects a subset of trajectory change points that describe a shape of the four-dimensional trajectory (operation 702). The process creates a message containing the subset of the trajectory change points in a format used by an aircraft computer system in the aircraft (operation 704). The process transmits the message to the aircraft computer system (operation 706). The process terminates thereafter.

Figure 8:
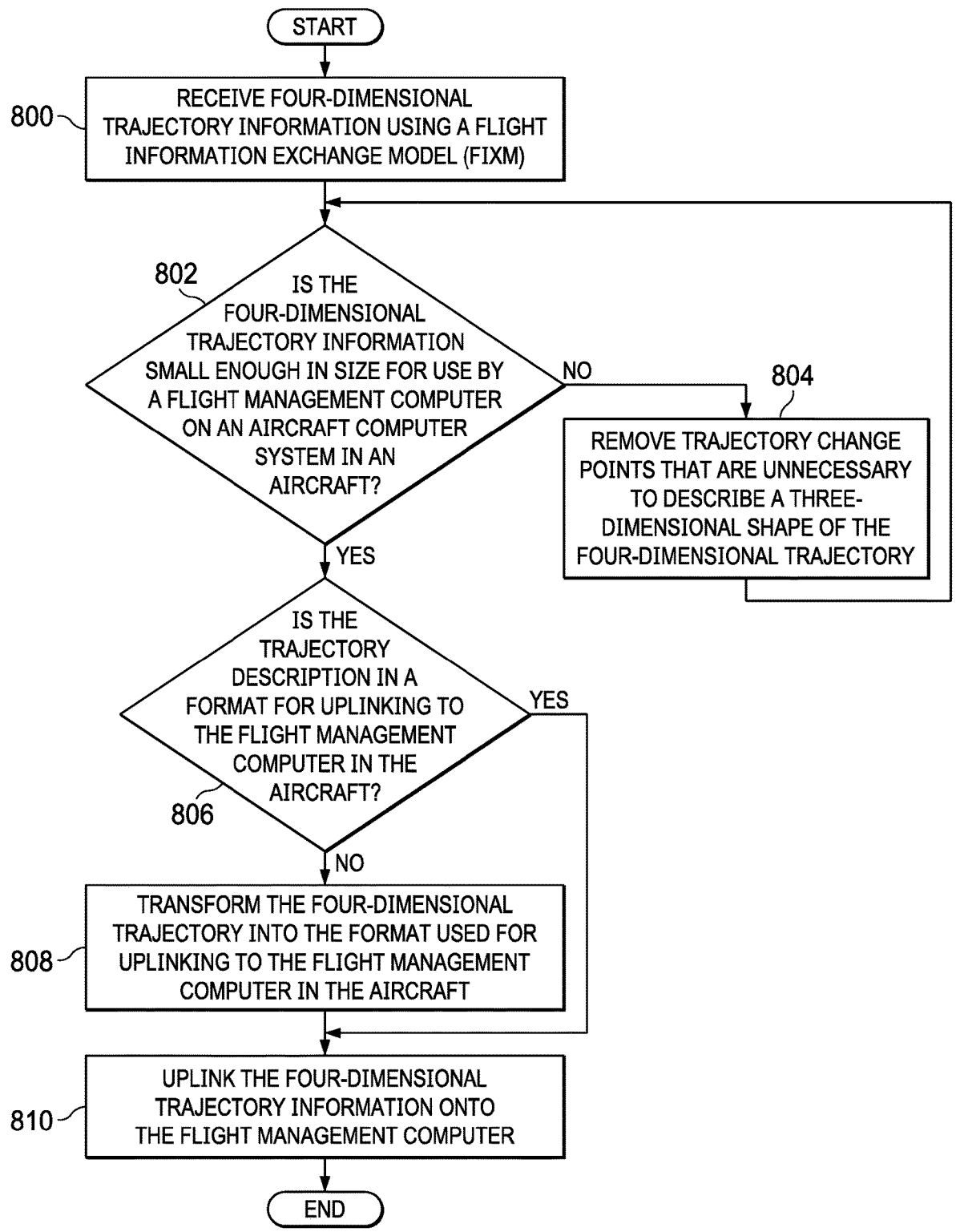
FIG. 8 is an illustration of a flowchart of a process for uplinking four-dimensional trajectory information for a four-dimensional trajectory to an aircraft in accordance with an illustrative embodiment.

With reference next to FIG. 8, an illustration of a flowchart of a process for uplinking four-dimensional trajectory information for a four-dimensional trajectory to an aircraft is depicted in accordance with an illustrative embodiment. The process in FIG. 8 can be implemented in hardware, software, or both. When implemented in software, the process can take the form of program code that is run by one of more processor units located in one or more hardware devices in one or more computer systems. For example, the process can be implemented in trajectory manager 202 in computer system 204 in FIG. 2. This depicted example describes the processing four-dimensional trajectory information generated at a ground location in which the four-dimensional trajectory information is described using Flight Information Exchange Model (FIXM) as a data model.

The process begins by receiving four-dimensional trajectory information using a Flight Information Exchange Model (FIXM) (operation 800). The process determines whether the four-dimensional trajectory information is small enough in size for use by a flight management computer on an aircraft computer system in an aircraft (operation 802). The size may be based on, for example, at least one of bandwidth for transmission to the aircraft, storage available in flight management computer, or other suitable factors. If the four-dimensional trajectory information is not of a small enough size, the process removes trajectory change points that are unnecessary to describe the three-dimensional shape of the four-dimensional trajectory (operation 804). The process then returns to operation 802.

With reference again operation 802, if the trajectory description is of a small enough size, the process determines whether the trajectory description is in a format for uplinking to the flight management computer in the aircraft (operation 806). In this example, the format is ARINC 702A and the protocol used to transmit for four-dimensional trajectory information is ACARS.

If the four-dimensional trajectory information is not in a format for uplinking, the process transforms the four-dimensional trajectory into the format used for uplinking to the flight management computer in the aircraft (operation 808). In this illustrative example, the four-dimensional trajectory information in this format for uplinking is also referred to as an amended plan for four-dimensional trajectory information and is described following ARINC 702A.

The process then uplinks the four-dimensional trajectory information onto the flight management computer (operation 810). The process terminates thereafter. With reference back to operation 806, if the trajectory information in a format for uplinking, the process proceeds to operation 810.

Figure 9:
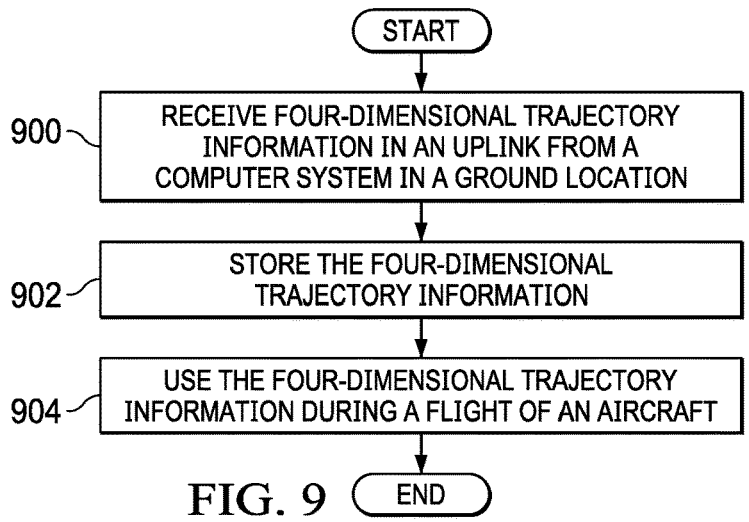
FIG. 9 is an illustration of a flowchart of a process for operating an aircraft in accordance with an illustrative embodiment.

With reference next to FIG. 9, an illustration of a flowchart of a process for operating an aircraft is depicted in accordance with an illustrative embodiment. The process in FIG. 9 can be implemented in hardware, software, or both. When implemented in software, the process can take the form of program code that is run by one of more processor units located in one or more hardware devices in one or more computer systems. For example, the process can be implemented in trajectory manager 202 in aircraft computer system 224 in FIG. 2.

The process begins by receiving four-dimensional trajectory information in an uplink from a computer system in a ground location (operation 900). The process stores the four-dimensional trajectory information (operation 902). The process uses the four-dimensional trajectory information during a flight of an aircraft (operation 904). The process terminates thereafter.

Operation 904 can be performed in a number of different ways. Operation 904 can control a flight of the aircraft using the subset of the trajectory change points in the message transmitted to the aircraft computer system. For example, the four-dimensional trajectory information can be used by an autopilot function in the computer system to fly the airplane to follow the four-dimensional trajectory described in the four-dimensional trajectory information during one or more portions of the flight of the aircraft. In another illustrative example, the process can display the four-dimensional trajectory on a display system in the aircraft computer system to a human operator in the aircraft, such as a pilot or a copilot. This display of information can be used by the pilot or the copilot to operate the aircraft.

As another example, once the ACARS message in ARINC 702A format has been received by the flight management computer in the air, the flight management computer can alert the pilot with the message. The pilot can accept, load, and execute an amended flight plan with the four-dimensional trajectory. In other words, the received trajectory will be the four-dimensional trajectory the aircraft will follow for the flight of the aircraft.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware can, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 10:
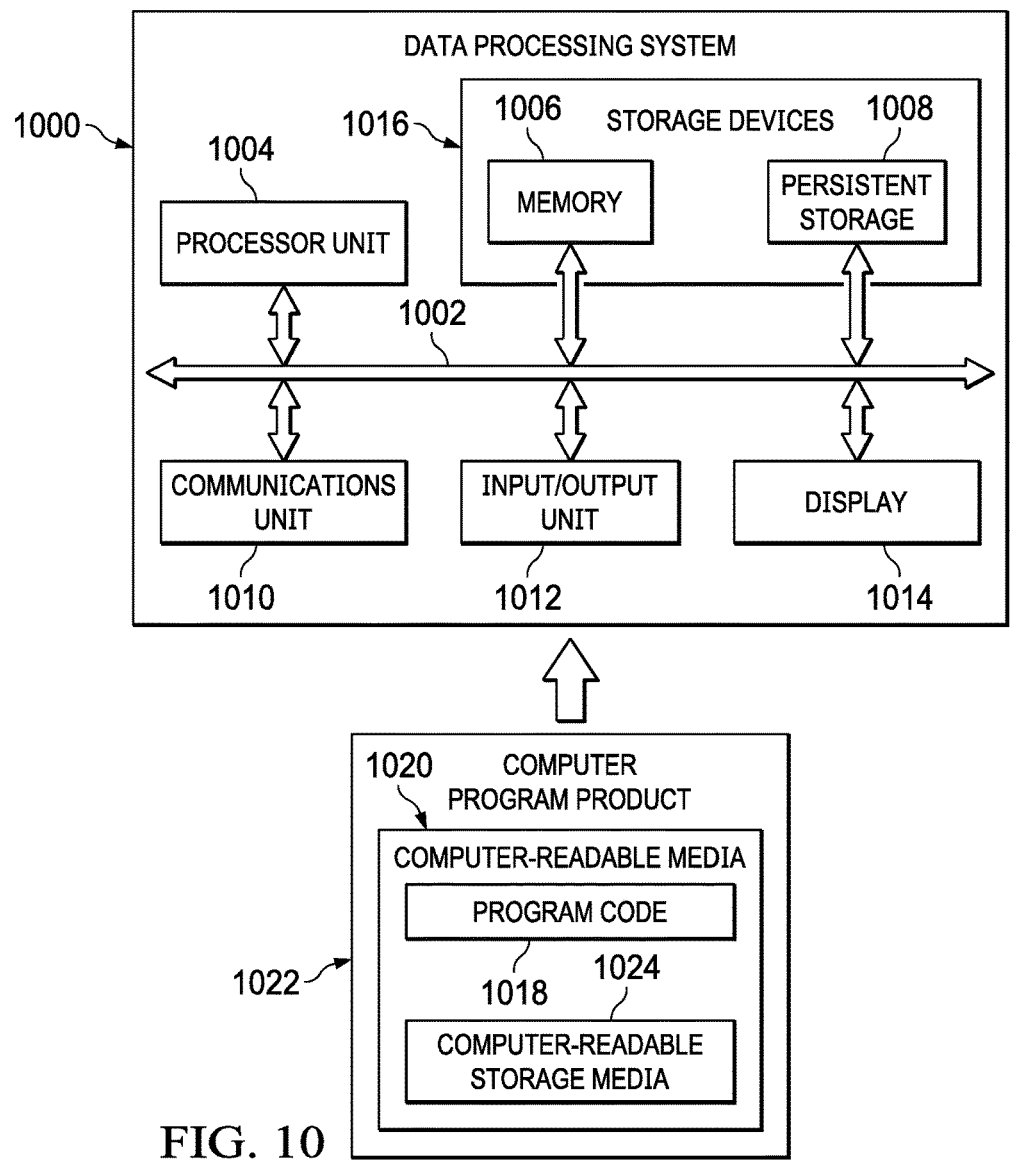
FIG. 10 is an illustration of a block diagram of a data processing system in accordance with an illustrative embodiment.

Turning now to FIG. 10, an illustration of a block diagram of a data processing system is depicted in accordance with an illustrative embodiment. Data processing system 1000 can be used to implement server computer 104, server computer 106, client devices 110, in FIG. 1. Data processing system 1000 can also be used to implement computer system 204 in FIG. 2 and aircraft computer system 224 in FIG. 2. In this illustrative example, data processing system 1000 includes communications framework 1002, which provides communications between processor unit 1004, memory 1006, persistent storage 1008, communications unit 1010, input/output (I/O) unit 1012, and display 1014. In this example, communications framework 1002 takes the form of a bus system.

Processor unit 1004 serves to execute instructions for software that can be loaded into memory 1006. Processor unit 1004 includes one or more processors. For example, processor unit 1004 can be selected from at least one of a multicore processor, a central processing unit (CPU), a graphics processing unit (GPU), a physics processing unit (PPU), a digital signal processor (DSP), a network processor, or some other suitable type of processor.

Memory 1006 and persistent storage 1008 are examples of storage devices 1016. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1016 may also be referred to as computer-readable storage devices in these illustrative examples. Memory 1006, in these examples, can be, for example, a random-access memory or any other suitable volatile or non-volatile storage device. Persistent storage 1008 can take various forms, depending on the particular implementation.

For example, persistent storage 1008 may contain one or more components or devices. For example, persistent storage 1008 can be a hard drive, a solid-state drive (SSD), a flash memory, a rewritable optical disk, a rewritable magnetic tape, or some combination of the above. The media used by persistent storage 1008 also can be removable. For example, a removable hard drive can be used for persistent storage 1008.

Communications unit 1010, in these illustrative examples, provides for communications with other data processing systems or devices. In these illustrative examples, communications unit 1010 is a network interface card.

Input/output unit 1012 allows for input and output of data with other devices that can be connected to data processing system 1000. For example, input/output unit 1012 can provide a connection for user input through at least one of a keyboard, a mouse, or some other suitable input device. Further, input/output unit 1012 can send output to a printer. Display 1014 provides a mechanism to display information to a user.

Instructions for at least one of the operating system, applications, or programs can be located in storage devices 1016, which are in communication with processor unit 1004 through communications framework 1002. The processes of the different embodiments can be performed by processor unit 1004 using computer-implemented instructions, which can be located in a memory, such as memory 1006.

These instructions are referred to as program code, computer-usable program code, or computer-readable program code that can be read and executed by a processor in processor unit 1004. The program code in the different embodiments can be embodied on different physical or computer-readable storage media, such as memory 1006 or persistent storage 1008.

Program code 1018 is located in a functional form on computer-readable media 1020 that is selectively removable and can be loaded onto or transferred to data processing system 1000 for execution by processor unit 1004. Program code 1018 and computer-readable media 1020 form computer program product 1022 in these illustrative examples. In the illustrative example, computer-readable media 1020 is computer-readable storage media 1024.

In these illustrative examples, computer-readable storage media 1024 is a physical or tangible storage device used to store program code 1018 rather than a medium that propagates or transmits program code 1018.

Alternatively, program code 1018 can be transferred to data processing system 1000 using a computer-readable signal media. The computer-readable signal media can be, for example, a propagated data signal containing program code 1018. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

The different components illustrated for data processing system 1000 are not meant to provide architectural limitations to the manner in which different embodiments can be implemented. In some illustrative examples, one or more of the components may be incorporated in or otherwise form a portion of, another component. For example, memory 1006, or portions thereof, can be incorporated in processor unit 1004 in some illustrative examples. The different illustrative embodiments can be implemented in a data processing system including components in addition to or in place of those illustrated for data processing system 1000. Other components shown in FIG. 10 can be varied from the illustrative examples shown. The different embodiments can be implemented using any hardware device or system capable of running program code 1018.

Thus, the illustrative embodiments provide a method, an apparatus, and a system for transmitting four-dimensional trajectories to an aircraft. In one illustrative example, the method transmits four-dimensional trajectories to an aircraft. Four-dimensional trajectory information for a four-dimensional trajectory for a flight of an aircraft is received. The four-dimensional trajectory information includes trajectory change points describing the four-dimensional trajectory. A subset of the trajectory change points that describe a shape of the four-dimensional trajectory is selected. A message containing the subset of the trajectory change points is created in a format used by an aircraft computer system in the aircraft. The message is transmitted to the aircraft computer system.

Thus, the illustrative examples provide one or more technical solutions that overcome a technical problem with sending four-dimensional trajectory information for a four-dimensional trajectory to aircraft computer system in an aircraft in which the four-dimensional trajectory information is not useable by the aircraft computer system. One or more illustrative examples provide a technical effect of enabling the sending of a four-dimensional trajectory in a manner that is usable by the aircraft computer system.

In this manner, a ground-based trajectory, following a data model, such as Flight Information Exchange Model (FIXM), can be processed to form an air-based trajectory following a standard, such as ARINC 702A, in a manner that avoids having to change models or protocols. The selection of information such as trajectory change points is made to identify a subset of the trajectory change points that describe the shape of the four-dimensional trajectory rather than a mechanical conversion of information from one standard or protocol to another standard or protocol.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An aircraft trajectory uplink system comprising:
   a computer system;
   a trajectory manager running on the computer system, wherein the trajectory manager operates to:
   receive a data model message created using a data model, wherein the data model message contains four-dimensional trajectory information for a four-dimensional trajectory for a flight of an aircraft;
   identify trajectory change points in the four-dimensional trajectory information;
   select a subset of the trajectory change points that describe a shape of the four-dimensional trajectory;

create an uplink message containing the subset of the trajectory change points in a format used by an aircraft computer system in the aircraft; and transmit the uplink message to the aircraft computer system in an uplink, wherein the uplink message is in the format used by the aircraft computer system; and a flight management computer in the aircraft computer system configured to use the subset of the trajectory change points in the uplink message to control the flight of the aircraft to follow the four-dimensional trajectory described in by the trajectory change points in the uplink message.

2. The aircraft trajectory uplink system of claim 1, wherein the uplink message comprises a number of waypoints and the subset of the trajectory change points, wherein the trajectory change points are selected from at least one of a start of a turn trajectory change point, or an altitude trajectory change point.

3. The aircraft trajectory uplink system of claim 1, wherein speed trajectory change points are omitted from the subset of the trajectory change points.

4. An aircraft trajectory uplink system comprising:
a computer system;
a trajectory manager running on the computer system, wherein the trajectory manager operates to:
identify four-dimensional trajectory information for a four-dimensional trajectory for a flight of an aircraft, wherein the four-dimensional trajectory information includes trajectory change points describing the four-dimensional trajectory;
select a subset of the trajectory change points in that describe a shape of the four-dimensional trajectory;
create a message containing the subset of the trajectory change points in a format used by an aircraft computer system in the aircraft; and
transmit the message to the aircraft computer system; and
a flight management computer in the aircraft computer system configured to use the subset of the trajectory change points in the message to control the flight of the aircraft.

5. The aircraft trajectory uplink system of claim 4, wherein in identifying the trajectory change points in the four-dimensional trajectory information, the trajectory manager operates to parse the four-dimensional trajectory information to identify the trajectory change points.

6. The aircraft trajectory uplink system of claim 4, wherein in selecting the subset of the trajectory change points that describe the shape of the four-dimensional trajectory, the trajectory manager operates to select the subset of the trajectory change points that describes the shape of the four-dimensional trajectory using a policy that defines what trajectory change points are needed to describe the shape of the four-dimensional trajectory.

7. The aircraft trajectory uplink system of claim 6, wherein the policy defines which trajectory change points and how many trajectory change points are selected based on at least one of bandwidth for an uplink and manageability by the flight management computer in the aircraft.

8. The aircraft trajectory uplink system of claim 4, wherein the four-dimensional trajectory information is received in an extensible markup language format and the message is an ARINC 702A message.

9. The aircraft trajectory uplink system of claim 4, wherein the four-dimensional trajectory information for the four-dimensional trajectory for the aircraft is received from a flight information exchange model.

10. The aircraft trajectory uplink system of claim 4, wherein the message is an amended flight plan for the aircraft used by the flight management computer in the aircraft computer system.

11. The aircraft trajectory uplink system of claim 4, wherein the message is transmitted to the aircraft over at least one of a wireless connection or a wired connection.

12. The aircraft trajectory uplink system of claim 4, wherein the four-dimensional trajectory information comprises the trajectory change points and waypoints.

13. The aircraft trajectory uplink system of claim 4, wherein the trajectory change points are selected from at least one of a speed trajectory change point, a start of a turn trajectory change point, or an altitude trajectory change point.

14. A method for transmitting four-dimensional trajectories to an aircraft, the method comprising:
identifying, by a computer system, four-dimensional trajectory information for a four-dimensional trajectory for a flight of an aircraft, wherein the four-dimensional trajectory information includes trajectory change points describing the four-dimensional trajectory;
selecting, by the computer system, a subset of the trajectory change points that describe a shape of the four-dimensional trajectory;
creating, by the computer system, a message containing the subset of the trajectory change points in a format used by an aircraft computer system in the aircraft;
transmitting, by the computer system, the message to the aircraft computer system; and
controlling a flight of the aircraft using the subset of the trajectory change points in the message transmitted to the aircraft computer system.

15. The method of claim 14 further comprising:
parsing the four-dimensional trajectory information for the trajectory change points.

16. The method of claim 14, selecting the subset of the trajectory change points that describe the shape of the four-dimensional trajectory comprises:
selecting the subset of the trajectory change points that describes the shape of the four-dimensional trajectory using a policy that defines what trajectory change points are needed to describe the shape of the four-dimensional trajectory.

17. The method of claim 16, wherein the policy defines which and how many trajectory change points are selected that describe the shape of the four-dimensional trajectory based on at least one of bandwidth for an uplink and manageability by the flight management computer in the aircraft.

18. The method of claim 17, wherein controlling the flight of the aircraft is performed by at least one of the flight management computer or a pilot in the aircraft.

19. The method of claim 14, wherein the four-dimensional trajectory information is received in an extensible markup language format and the message is an ARINC 702A message in an ACARS format.

20. The method of claim 14, wherein the four-dimensional trajectory information for the four-dimensional trajectory for the aircraft is received from flight information exchange model.

21. The method of claim 14, wherein the message is an amended flight plan for the aircraft used by the flight management computer in the aircraft computer system.

22. The method of claim 14, wherein the message is transmitted to the aircraft over at least one of a wireless connection or a wired connection.

23. The method of claim 14, wherein the four-dimensional trajectory information comprises waypoints and the trajectory change points.

24. The method of claim 14, wherein the trajectory change points are selected from at least one of a speed trajectory change point, a start of a turn trajectory change point, or an altitude trajectory change point.

25. The aircraft trajectory uplink system of claim 1, wherein the uplink message is an amended flight plan for the aircraft used by the flight management computer in the aircraft computer system.

\* \* \* \* \*